US012734588B2

(12) United States Patent
Huang et al.

(10) Patent No.: US 12,734,588 B2
(45) Date of Patent: Sep. 15, 2026

(54) PRECISELY-POSITIONED DRILLING APPARATUS FOR STEEL TUBULAR JOINTS AND APPLICATION METHOD THEREOF

(71) Applicants: Fuzhou University, Fuzhou City (CN); Fuzhou Urban and Rural Construction Group Co., Ltd, Fuzhou City (CN)

(72) Inventors: Yufan Huang, Fuzhou City (CN); Qingxiong Wu, Fuzhou City (CN); Shanqing Chi, Fuzhou City (CN); Dingxi Cai, Fuzhou City (CN); Kangming Chen, Fuzhou City (CN); En Lin, Fuzhou City (CN); Mingqing Yang, Fuzhou City (CN); Yilun Yang, Fuzhou City (CN); Dongdong Han, Fuzhou City (CN); Jianping Luo, Fuzhou City (CN)

(73) Assignee: Fuzhou Urban and Rural Construcation Group CO., Ltd, Fuzhou (CN)

(*) Notice: Subject to any disclaimer, the term of this patent is extended or adjusted under 35 U.S.C. 154(b) by 319 days.

(21) Appl. No.: 18/731,271

(22) Filed: Jun. 1, 2024

(65) Prior Publication Data

US 2025/0010379 A1 Jan. 9, 2025

(30) Foreign Application Priority Data

Jul. 5, 2023 (CN) ........................ 202310817315.4

(51) Int. Cl.
*B23B 39/00* (2006.01)
*B23B 35/00* (2006.01)
(Continued)

(52) U.S. Cl.
CPC ............ *B23B 39/003* (2013.01); *B23B 35/00* (2013.01); *B23B 41/003* (2013.01); *B23B 47/281* (2013.01); *B23B 2215/72* (2013.01)

(58) Field of Classification Search
CPC ... B23B 39/003; B23B 41/003; B23B 47/281; B23B 2215/72; B23B 35/00
See application file for complete search history.

(56) References Cited

U.S. PATENT DOCUMENTS 3,060,769 A * 10/1962 Heider ................. B25H 1/0064 408/95
4,030,854 A * 6/1977 Grannis .................. B23B 47/28 408/92

(Continued)

FOREIGN PATENT DOCUMENTS

CN 111151787 A * 5/2020 ............. B23Q 3/062

*Primary Examiner* — Jermie E Cozart
(74) *Attorney, Agent, or Firm* — Olive Law Group, PLLC

(57) ABSTRACT

The present disclosure belongs to the technical field of tools for bridge reinforcement, and particularly relates to a precisely-positioned drilling apparatus for steel tubular joints. According to the present disclosure, a lifting frame unit, an electric drill, a lever unit, a positioning tube unit, and a diagonal tensioning member unit are arranged on a base unit such that 1. during drilling, a drill rod is not prone to deviation, and a drilling action is relatively precise, resulting in an approximately circular shape of a final drilled hole; and 2. the above lever unit is essentially a labor-saving lever that ensures relatively easy and convenient drilling operations. Additionally, the present disclosure further discloses an application method of the apparatus, which ensures that the apparatus may stably fit with and be safely available for electric drills with various sizes and specifications.

10 Claims, 7 Drawing Sheets

(51) Int. Cl.
*B23B 41/00* (2006.01)
*B23B 47/28* (2006.01)

(56) References Cited

U.S. PATENT DOCUMENTS

| | | | | |
|---|---|---|---|---|
| 5,348,428 | A * | 9/1994 | Turner | B25H 1/0064 408/136 |
| 2005/0013673 | A1* | 1/2005 | Tucker | B23Q 3/069 408/53 |
| 2005/0025596 | A1* | 2/2005 | Turner | F16L 41/06 408/234 |
| 2006/0186281 | A1* | 8/2006 | Thiessen | F16M 11/2014 408/187 |
| 2010/0243072 | A1* | 9/2010 | Mcgraw | E21B 17/01 137/15.13 |
| 2013/0251470 | A1* | 9/2013 | Pirovano | B23B 41/003 408/46 |
| 2014/0318324 | A1* | 10/2014 | Buchner | B23Q 1/703 408/67 |
| 2020/0282469 | A1* | 9/2020 | Irvine | B23Q 3/002 |

* cited by examiner

PRECISELY-POSITIONED DRILLING APPARATUS FOR STEEL TUBULAR JOINTS AND APPLICATION METHOD THEREOF

CROSS REFERENCE TO RELATED APPLICATION

This application claims priority to Chinese Patent Application Number 2023108173154, filed Jul. 5, 2023, the disclosure of which is incorporated herein by reference in its entirety.

TECHNICAL FIELD

The present disclosure belongs to the technical field of tools for bridge reinforcement, and particularly relates to a precisely-positioned drilling apparatus for steel tubular joints and an application method thereof.

BACKGROUND

A conventional common concrete-filled steel tube trussed arch bridge has a steel tube support structure that mainly includes a transverse main tube, as well as vertical or diagonal branch tubes. Wherein, joints where the main tube and the branch tubes are intersected form what are referred to as tubular joints.

As service years increase, traffic volume grows, and overloading conditions intensify, the tubular nodes are more prone to fatigue-induced cracking. One of the common repair methods for addressing fatigue cracks in the tubular joints is drilling to arrest crack propagation. Conventionally, the cracks are perforated in the front of crack extension sections, so that the further propagation of the cracks may be blocked.

In the process of drilling to arrest crack propagation, it is necessary to provide an electric drill as core equipment, with suitable auxiliary tools to ensure that it does not deviate during positioning for drilling, thereby guaranteeing that drilling positions are accurate and precisely aligned at crack tips.

For example, the Chinese Utility Model Patent (Patent No. CN206663158U, published on Nov. 24, 2017) has disclosed an electric hand drill positioning auxiliary assembly for steel case roof beam drilling crack arrest, which includes a horizontal positioning device, a vertical positioning device, a depth control device, a drilling lighting device, and a magnetic support. The drilling lighting device is embedded into a vertical angle adjustment knob, and the horizontal positioning device is connected with the vertical positioning device via a draw-in groove. The horizontal positioning device has an inner tube and a tooth socket, the vertical positioning device has an outer tube, the draw-in groove, and the vertical angle adjustment knob, and the depth control device includes a T-shaped advance slide and a slider.

The electric hand drill positioning auxiliary assembly in the utility model patent could precisely adjust and fix the horizontal and vertical angles of an electric hand drill, control the depths of crack-arresting holes, and avoid phenomena such as shakes, hole position deviation, and drill bit slippage during the drilling process, thereby effectively ensuring the positions, angles, depths, and smoothness of the crack-arresting holes.

However, during the actual operation of drilling for crack arresting using this auxiliary assembly, it at least has the following two deficiencies, which are also technical problems to be solved by the present disclosure:

1. The auxiliary assembly is ultimately connected to the electric hand drill through a connecting band, which is far from sufficient. In other words, the auxiliary assembly only ensures pre-drilling precise alignment, but during the drilling process, the electric hand drill is prone to deviation, and the final shapes of drilled holes are unlikely to be a regular circle.
2. When the auxiliary assembly is in use, the electric hand drill still requires to be directly pressed and jacked into the auxiliary assembly, which is relatively laborsome.

Therefore, in summary, there is an urgent need for a novel auxiliary tool that performs drilling actions without deviation and provides a relatively ease way in the drilling of a drill bit for cooperating with the electric hand drill in drilling for crack arresting at steel tubular joints.

SUMMARY

The present disclosure provides a precisely-positioned drilling apparatus for steel tubular joints, a lifting frame unit, an electric drill, a lever unit, a positioning tube unit, and a diagonal tensioning member unit are arranged on a base unit such that 1. during drilling, a drill rod is not prone to deviation, and a drilling action is relatively precise, resulting in an approximately circular shape of a final drilled hole; and 2. the above lever unit is essentially a labor-saving lever that ensures relatively easy and convenient drilling operations.

Additionally, the present disclosure further discloses an application method of the apparatus, which ensures that the apparatus may stably fit with and be safely available for electric drills with various sizes and specifications.

The technical solution of the present disclosure to solve the above problems is as follows: A precisely-positioned drilling apparatus for steel tubular joints, structurally includes an electric drill, wherein the precisely-positioned drilling apparatus further includes a base unit for connecting branch tubes, a lifting frame unit which is in inserted connection to the base unit and used for installing the electric drill, a lever unit which is arranged on the base unit and used for pushing the electric drill, a positioning tube unit which is arranged on the lifting frame unit and used for sleeving a drill rod, and a diagonal tensioning member unit which is arranged on the lifting frame unit and used for connecting a grab handle.

The further preferred technical solution is as follows: The base unit includes a block body, an intermediate slot which is formed in the block body and used for installing the lever unit, and 2 T-shaped snap-fit through holes which are formed in the block body, respectively positioned on two sides of the intermediate slot, and used for allowing the lifting frame unit to be inserted therein.

The further preferred technical solution is as follows: The lever unit includes a fixing shaft arranged in the intermediate slot, and a push rod which has one end that is articulated on the fixing shaft and is used for pushing a main body.

The further preferred technical solution is as follows: The lifting frame unit includes T-shaped strips which are inserted into the T-shaped snap-fit through holes, 2 connecting strips which are arranged on the two T-shaped strips, respectively positioned on two sides of the block body, and used for installing the diagonal tensioning member unit, a central hole plate which is arranged on the two T-shaped strips and used for allowing the main body to be inserted therein for fixing, and an upper hole plate which is arranged on the two T-shaped strips, and used for allowing the drill rod to be inserted therein and installing the positioning tube unit.

The further preferred technical solution is as follows: The lifting frame unit further includes 2 transverse plates which are respectively arranged on the central hole plate and the upper hole plate and used for connecting the two T-shaped strips, and 2 side holes which are formed in the upper hole plate and used for allowing the positioning tube unit to be inserted therein for installation.

The further preferred technical solution is as follows: The positioning tube unit includes movable rods which are inserted into the side holes, a positioning hole plate which is arranged on the two movable rods and used for allowing the drill rod to be inserted therein, an outer tube which is arranged on the positioning hole plate, sleeves the drill rod, and is used for positioning on cracks, and jack-up springs which sleeve the movable rods, and are connected with the positioning hole plate and the upper hole plate.

The further preferred technical solution is as follows: The diagonal tensioning member unit includes a connecting ring sleeving the grab handle, connecting ropes arranged on the connecting ring, flat plates which are arranged on the connecting ropes and used for being fixedly snap-fit on the connecting strips, and screw stems which are arranged on the flat plates and used for being in fixed and threaded connection on the connecting strips.

The further preferred technical solution is as follows: The two connecting ropes are provided, which are respectively arranged on two sides of the lever unit.

The further preferred technical solution is as follows: The lifting frame unit further includes stepless adjustment openings which are formed in the connecting strips, and used for allowing the flat plates to be inserted therein for snap-fitting, and a plurality of pairs of stepped adjustment threaded grooves which are formed in the stepless adjustment openings and used for installing the screw stems.

According to an application method of the precisely-positioned drilling apparatus for steel tubular joints, after different sizes of electric drills are replaced, a position where the diagonal tensioning member unit is connected to the lifting frame unit is adjusted, and the electric drill is then pushed to perform drilling operation for crack arresting.

Figure 1:
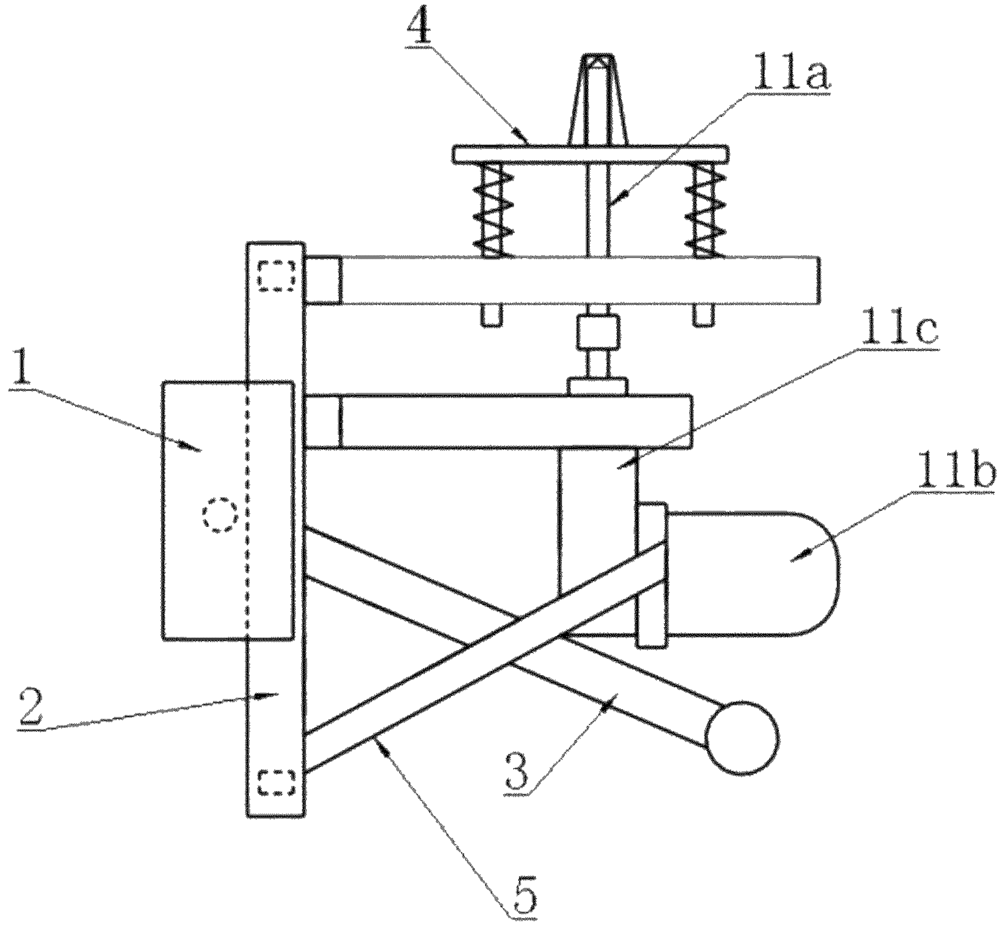
FIG. 1 is a structural schematic diagram according to the present disclosure.

In the drawings, the meanings of reference signs are as follows:

branch tube a, and main tube b;

electric drill 11, drill rod 11*a*, grab handle 11*b*, main body 11*c*, hoop 12, base plate 13, three-way adjuster 14, and round rotator 15;

base unit 1, lifting frame unit 2, lever unit 3, positioning tube unit 4, and diagonal tensioning member unit 5; and block body 101, intermediate slot 102, T-shaped snap-fit through hole 103, fixing shaft 301, push rod 302, T-shaped strip 201, connecting strip 202, central hole plate 203, upper hole plate 204, transverse plate 205, side hole 206, movable rod 401, positioning hole plate 402, outer tube 403, jack-up spring 404, connecting ring 501, connecting rope 502, flat plate 503, screw stem 504, stepless adjustment opening 207, and stepped adjustment threaded groove 208.

DETAILED DESCRIPTION OF THE EMBODIMENTS

The following descriptions are only the preferred embodiments of the present disclosure, but are not construed as limiting the scope of the present disclosure.

Figure 2:
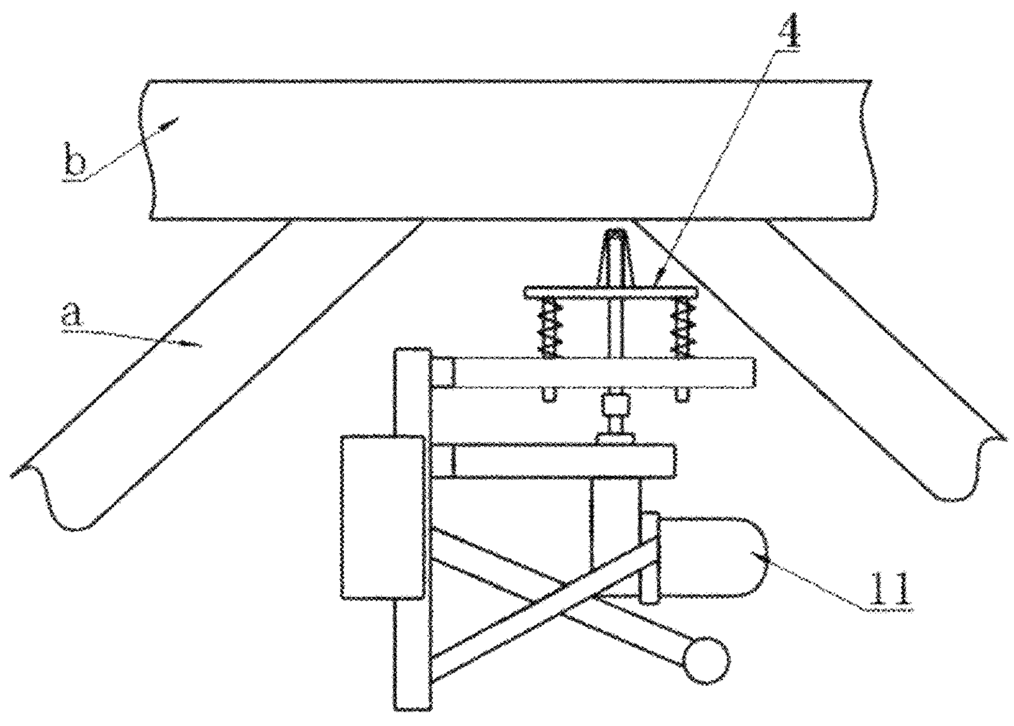
FIG. 2 is a schematic diagram illustrating an application method according to the present disclosure.
Figure 3:
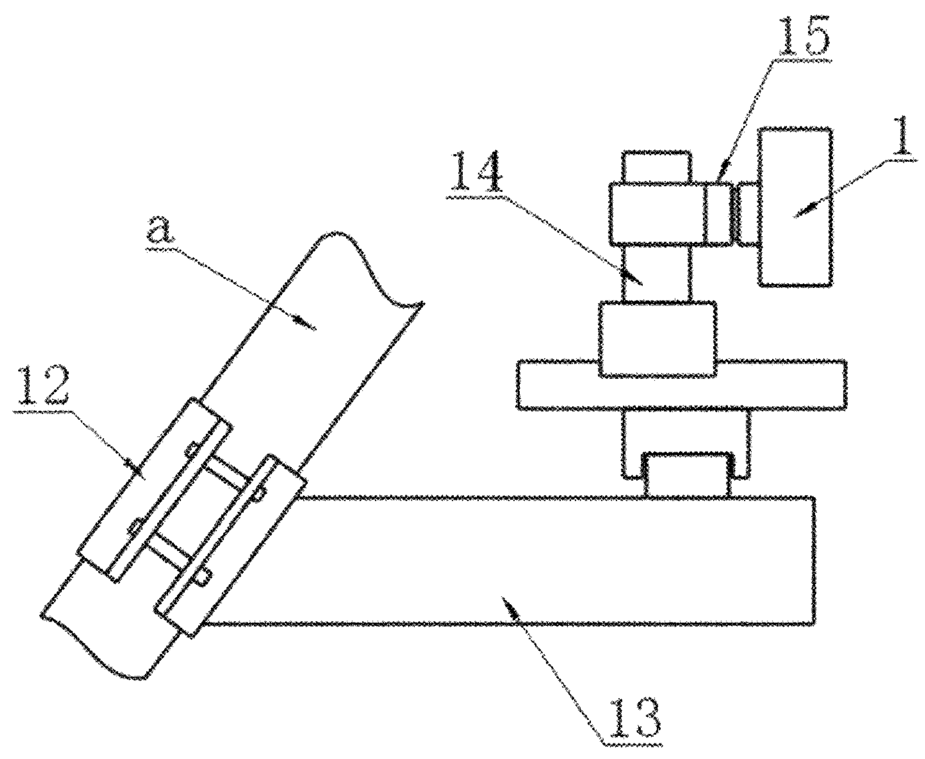
FIG. 3 is a schematic diagram illustrating an installation method of a base unit according to the present disclosure.
Figure 4:
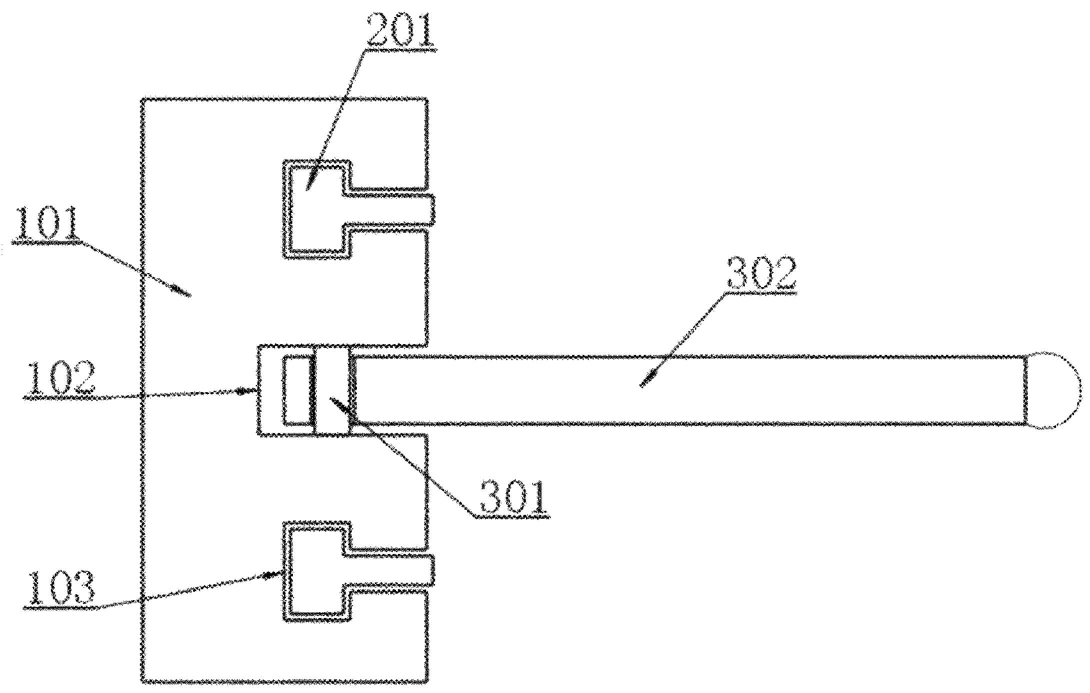
FIG. 4 is a schematic diagram illustrating a position and a structure of a base unit according to the present disclosure as viewed from a top.
Figure 5:
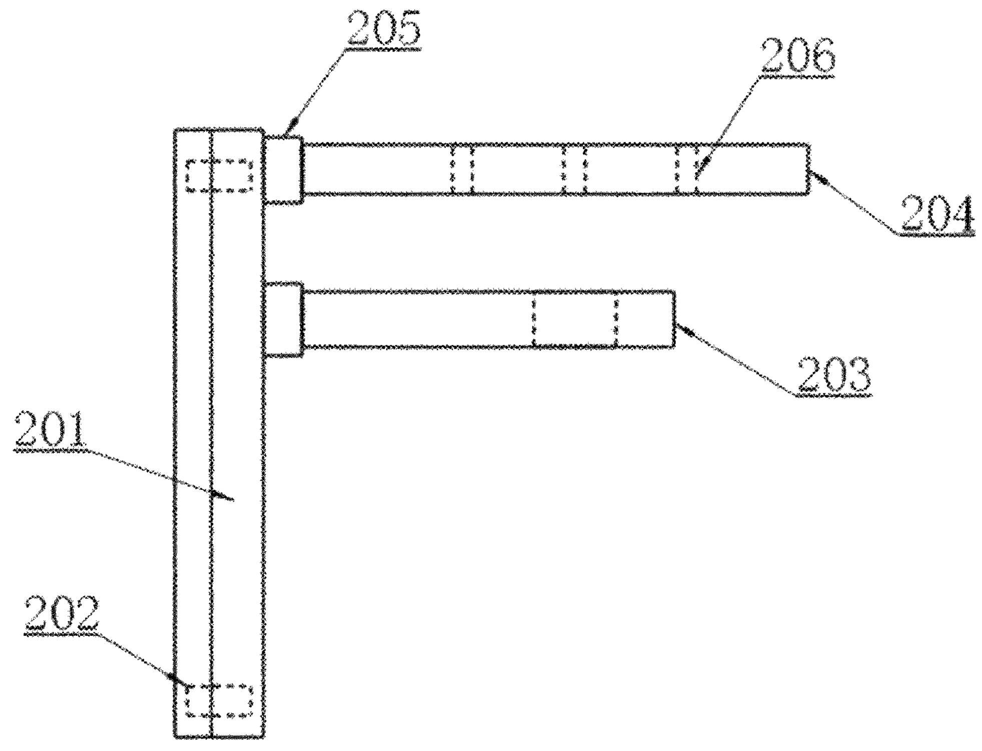
FIG. 5 is a schematic structural diagram illustrating a lifting frame unit according to the present disclosure.
Figure 6:
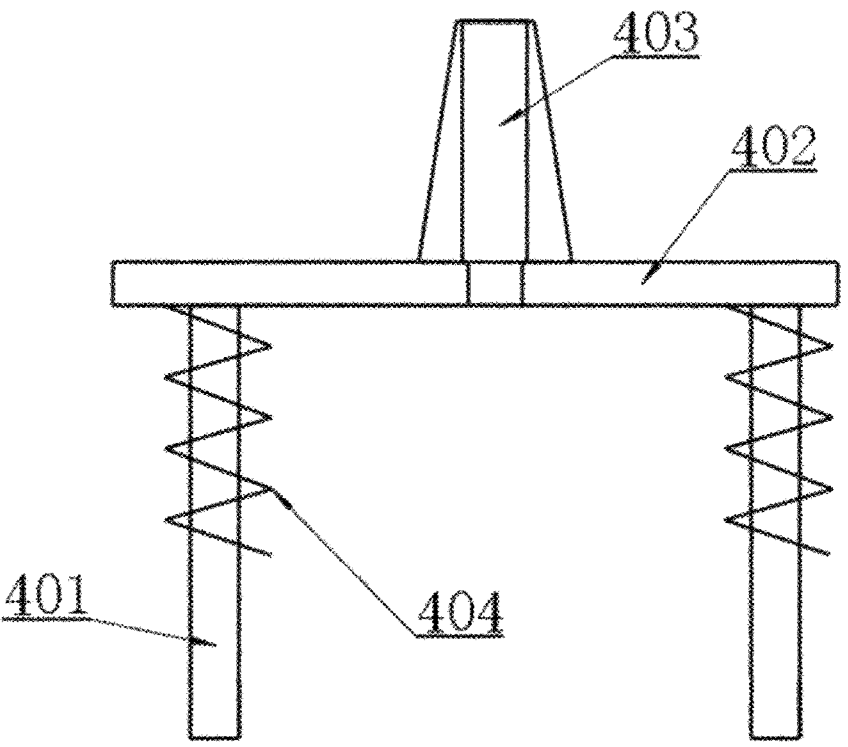
FIG. 6 is a schematic structural diagram illustrating a positioning tube unit according to the present disclosure.
Figure 7:
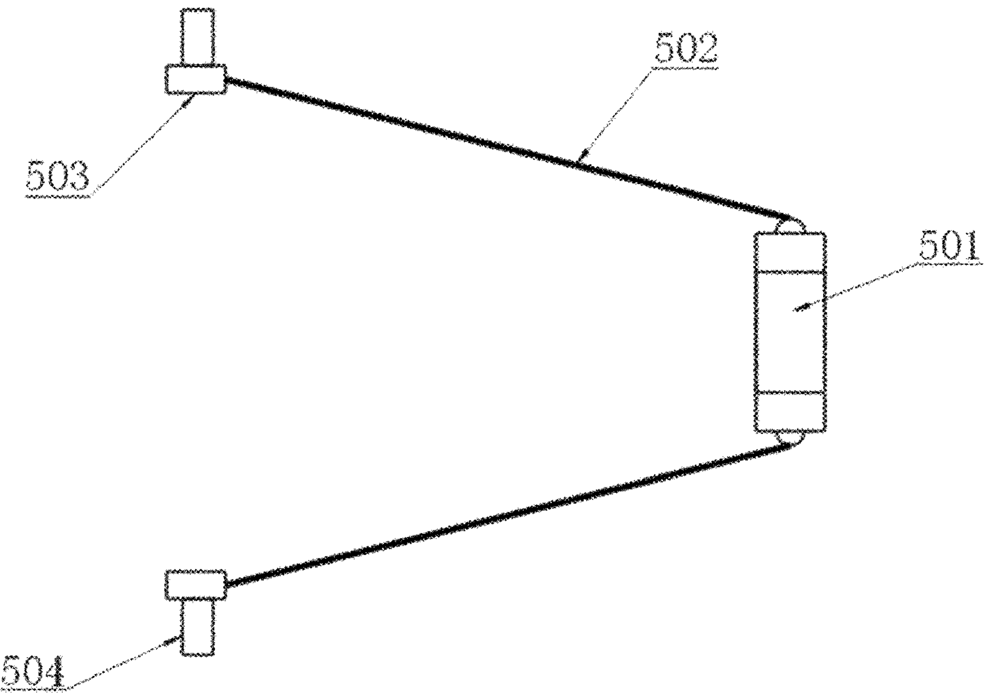
FIG. 7 is a schematic structural diagram illustrating a diagonal tensioning member unit according to the present disclosure.
Figure 8:
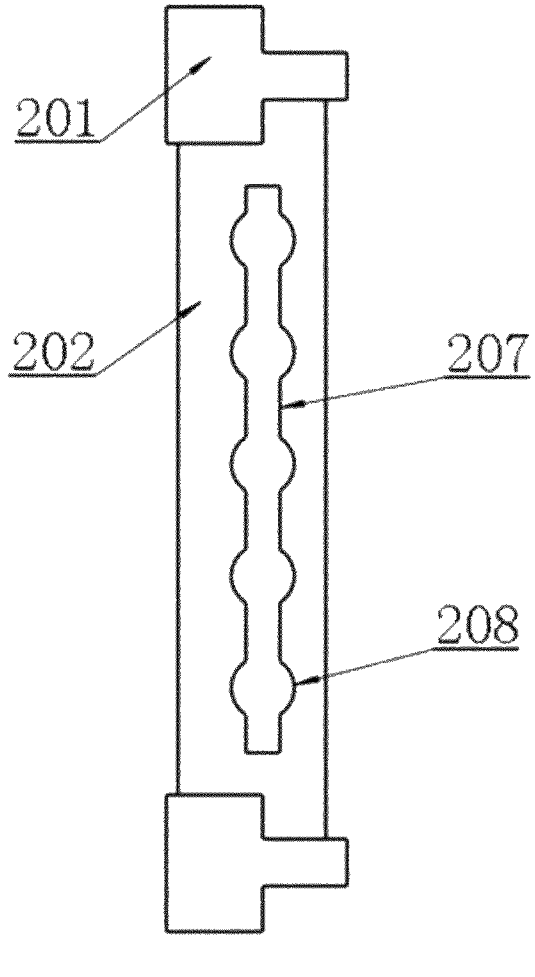
FIG. 8 is a schematic diagram illustrating a shape of a connecting strip according to the present disclosure as viewed from a top.
Figure 9:
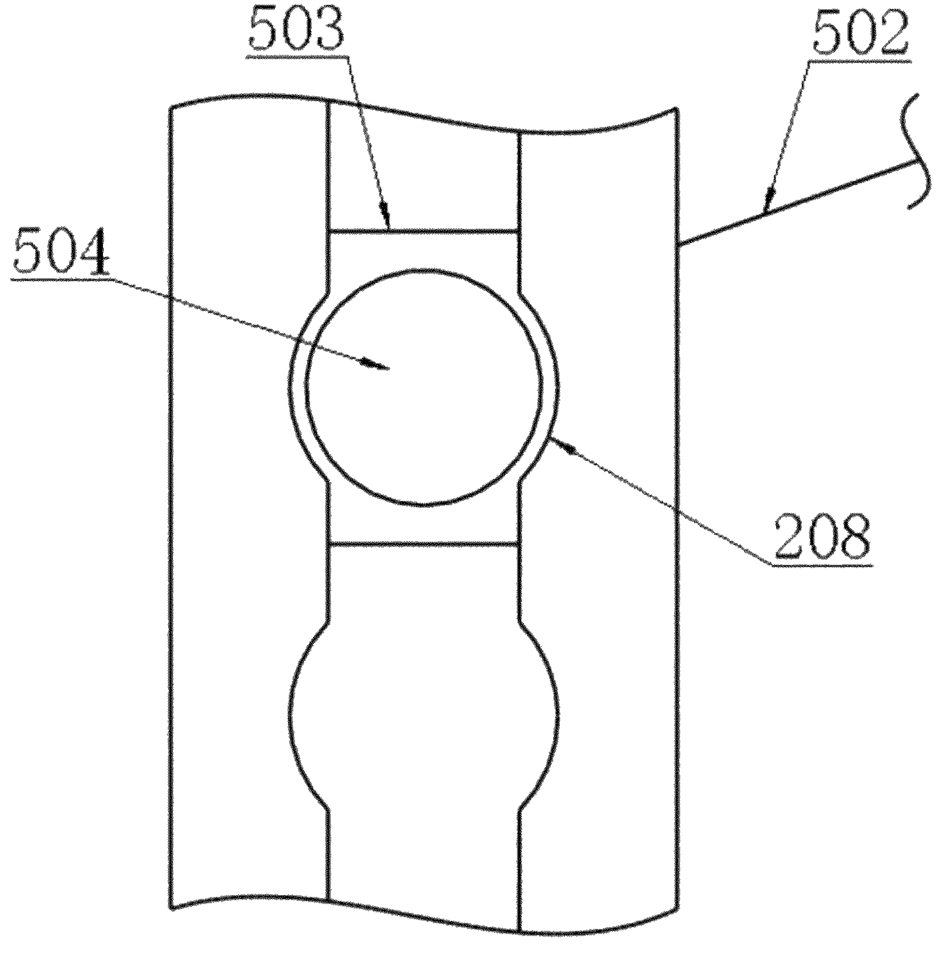
FIG. 9 is a schematic diagram illustrating an application method of a stepped adjustment threaded groove according to the present disclosure.
Figure 10:
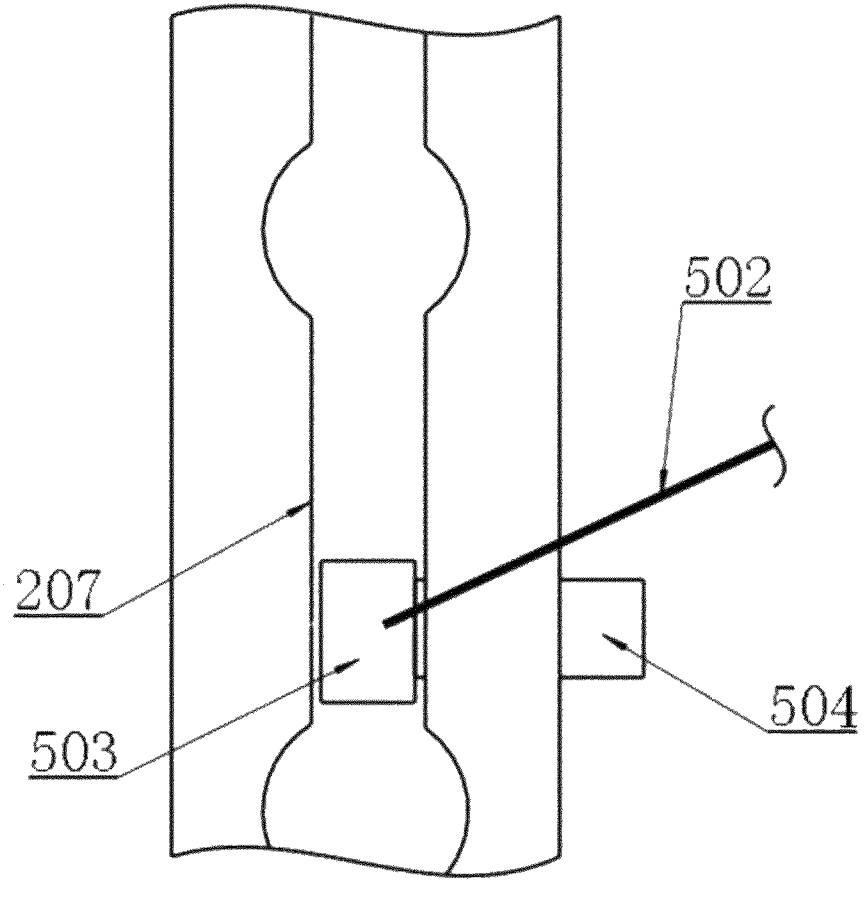
FIG. 10 is a schematic diagram illustrating an application method of a stepless adjustment opening according to the present disclosure.

As shown in FIGS. 1-10, a precisely-positioned drilling apparatus for steel tubular joints, structurally includes an electric drill 11, wherein the precisely-positioned drilling apparatus further includes a base unit 1 for connecting branch tubes a, a lifting frame unit 2 which is in inserted connection to the base unit 1 and used for installing the electric drill 11, a lever unit 3 which is arranged on the base unit 1 and used for pushing the electric drill 11, a positioning tube unit 4 which is arranged on the lifting frame unit 2 and used for sleeving a drill rod 11*a*, and a diagonal tensioning member unit 5 which is arranged on the lifting frame unit 2 and used for connecting a grab handle 11*b*.

In this embodiment, the term "precisely positioned" refers to the effect of fixing without deflection during a drilling process, rather than initially aligning with the electric drill 11 at a crack tip.

The base unit 1 may, from the outset, achieve the precise positioning and flexible adjustment effects at the crack tip through existing components such as a hoop 12, a base plate 13, a three-way adjuster 14, and a circular rotator 15. Wherein the three-way regulator 14 includes 3 pairs of sliding rails and sliders which are adjusted back and forth, left and right and up and down, and the circular rotator 15 includes a fixed disc, a rotating disc and fastening bolts between the discs.

Wherein a main body of the apparatus is made of metal; during the drilling of the apparatus, the base unit 1 is inactive, the lever unit 3 directly pushes the electric drill 11 upward to indirectly push the lifting frame unit 2 upward. The positioning tube unit 4 reaches a crack either before or simultaneously with the drill rod 11*a*. Subsequently, as the lifting frame unit 2 continues to ascend, the positioning tube unit 4 remains stationary, while the drill rod 11*a* keeps ascending, which ultimately completes the drilling operation with the annular limiting function.

In other words, a position and size of a tube orifice of the positioning tube unit 4 are a final drilling position and size, and a maximum retraction distance of the positioning tube unit 4 on the lifting frame unit 2 is a maximum depth of the drilling operation.

Finally, the diagonal tensioning member unit 5 achieves the effect of further strengthening a connecting strength between the lifting frame unit 2 and the electric drill 11, making the lifting frame unit and the electric drill always synchronously ascend and descend.

The base unit 1 includes a block body 101, an intermediate slot 102 which is formed in the block body 101 and used for installing the lever unit 3, and 2 T-shaped snap-fit through holes 103 which are formed in the block body 101, respectively positioned on two sides of the intermediate slot 102, and used for allowing the lifting frame unit 2 to be inserted therein.

In this embodiment, "a horizontal section of a T-shaped structure" of the T-shaped snap-fit through hole 103 is located on an inside, while "a vertical section of the T-shaped structure" is located on an outer side, which ultimately ensures that the lifting frame unit 2 may only slide in a vertical direction without detaching in a transverse direction.

Additionally, the block body 101 is a rectangular solid, and a vertical width of the intermediate slot 102 only needs to ensure that the lever unit 3 has a sufficient space for vertical rotation, which may not be an integral slot penetrating up and down.

The lever unit 3 includes a fixing shaft 301 arranged in the intermediate slot 102, and a push rod 302 which has one end that is articulated on the fixing shaft 301 and is used for pushing a main body 11*c*.

In this embodiment, the push rod 302 directly presses on an edge of the main body 11*c*, and the main body is in inserted connection to the lifting frame unit 2 and connected with the diagonal tensioning member unit 5, so as to finally ensure that the lifting frame unit 2 may slidably ascend and descend in a vertical direction together with the electric drill 11.

When the push rod 302 pushes the main body 11*c*, the electric drill 11 is just in firm inserted connection with the lifting frame unit 2, so that the entire drilling action for cracks is more stable and safer.

The lifting frame unit 2 includes T-shaped strips 201 which are inserted into the T-shaped snap-fit through holes 103, 2 connecting strips 202 which are arranged on the two T-shaped strips 201, positioned on two sides of the block body 101, and used for installing the diagonal tensioning member unit 5, a central hole plate 203 which is arranged on the two T-shaped strips 201 and used for allowing the main body 11*c* to be inserted therein for fixing, and an upper hole plate 204 which is arranged on the two T-shaped strips 201, and used for allowing the drill rod 11*a* to be inserted therein and installing the positioning tube unit 4.

In this embodiment, the connecting strips 202 include the following effects:

1. the two T-shaped strips 201 are connected, so that the lifting frame unit 2 may constitute a fixed integral frame;
2. the two connecting strips 202 located up and down are limiting endpoints of ascending and descending processes of the lifting frame unit 2, so that the lifting frame unit 2 may be prevented from excessive ascending and descending, thereby avoiding separation or detachment from the block body 101; and
3. the connecting strips 202 also serve as fixed connection parts of the diagonal tensioning member unit 5.

Additionally, a diameter of an opening in the upper hole plate 204 is slightly larger than a diameter of the drill rod 11*a*, thereby preventing the drill rod 11*a* from swinging left and right substantially, while a diameter of an opening in the central hole plate 203 needs to ensure sufficient fastening when the main body 11*c* is inserted, so as to prevent the main body 11*c* from loosening and falling.

The lifting frame unit 2 further includes 2 transverse plates 205 which are respectively arranged on the central hole plate 203 and the upper hole plate 204 and used for connecting the two T-shaped strips 201, and 2 side holes 206 which are formed in the upper hole plate 204 and used for allowing the positioning tube unit 4 to be inserted therein for installation.

In this embodiment, the T-shaped strips 201 are located on two sides in the transverse direction, and the central hole plate 203 and the upper hole plate 204 are located at centers in the transverse direction, so the transverse plates 205 are a sufficiently effective way to connect the T-shaped strips 201 and the central hole plate.

The positioning tube unit 4 includes movable rods 401 which are inserted into the side holes 206, a positioning hole plate 402 which is arranged on the two movable rods 401 and used for allowing the drill rod 11*a* to be inserted therein, an outer tube 403 which is arranged on the positioning hole plate 402, sleeves the drill rod 11*a*, and is used for positioning on cracks, and jack-up springs 404 which sleeve the movable rods 401, and are connected with the positioning hole plate 402 and the upper hole plate 204.

In this embodiment, an inner diameter of the outer tube 403 is 2-8 mm larger than the diameter of the drill rod 11*a*, thereby minimizing the deviation of the drill rod 11*a* in the left-right direction during the drilling process.

Additionally, one end of each of the jack-up springs 404 is connected to the upper hole plate 204, the other end is connected to the movable rod 401, and when the jack-up springs 404 are compressed to the shortest state, it corresponds to the maximum insertion depth of the drill rod 11*a*.

Finally, the position and size of an opening in the positioning hole plate 402 are consistent with "drill rod hole" parameters of the upper hole plate 204.

The diagonal tensioning member unit 5 includes a connecting ring 501 sleeving the grab handle 11*b*, connecting ropes 502 arranged on the connecting ring 501, flat plates 503 which are arranged on the connecting ropes 502 and used for being fixedly snap-fit on the connecting strips 202, and screw stems 504 which are arranged on the flat plates 503 and used for being in fixed and threaded connection on the connecting strips 202.

In this embodiment, the diagonal tensioning member unit 5 serves to further reinforce connection between the electric drill 11 and the T-shaped strips 201. Accordingly, diagonal tensioning plates may further be arranged between the transverse plates 205 and the central hole plate 203, and between the transverse plates 205 and the upper hole plate 204 on two sides.

Additionally, the connecting ring 501 is made of common elastic rubber, which may only sleeve the grab handle 11*b*, or tighten the main body 11*c* while sleeving the grab handle 11*b*.

Wherein, the diagonal tensioning member unit 5 has 2 different installation manners on the connecting strips 202, so as to ensure that the fastening of the diagonal tensioning member unit 5 is more flexible.

Finally, when the apparatus and the electric drill 11 are required to be used for a long period of time in multiple places, the connecting ropes 502 may be in stable screwed connection by the screw stems 504, and if drilling for crack arresting is required only in one place and the overall drilling time is short, the connecting ropes may be rapidly and temporarily snap-fit by the flat plates 503.

The two connecting ropes 502 are provided, which are respectively arranged on two sides of the lever unit 3.

In this embodiment, the diagonal tensioning member unit 5 presents a V shape as viewed from a bottom, and the 2 connecting ropes 502 may fully, smoothly and symmetrically "press" the electric drill 11 against the lifting frame unit 2.

The lifting frame unit 2 further includes stepless adjustment openings 207 which are formed in the connecting strips 202, and used for allowing the flat plates 503 to be inserted therein for snap-fitting, and a plurality of pairs of stepped adjustment threaded grooves 208 which are formed in the stepless adjustment openings 207 and used for installing the screw stems 504.

In this embodiment, the stepless adjustment openings 207 and the plurality of pairs of stepped adjustment threaded grooves 208 are formed such that the diagonal tensioning member unit 5 may tension and fix the electric drills 11 with different sizes and specifications to ensure that the auxiliary apparatus may fit with various electric drills with different sizes, and thus improving the practicability greatly.

Wherein, a buckle latch is further arranged between the connecting rope 502 and the connecting ring 501 to ensure that when the stepless adjustment opening 207 is snap-fit by the flat plates 503, the screw stems 504 are located below the connecting strips 202, and the connecting ropes 502 are located above the connecting strips 202, so that the stability of the state where the flat plates 503 are in inserted connection in the stepless adjustment opening 207 may be further enhanced.

Additionally, the stepless adjustment opening 207 has the advantage over the stepped adjustment threaded groove 208 in that it allows for stepless adjustment, that is, the flat plates 503 may slightly and slidably adjust the position of a fixed point at the stepless adjustment opening 207, so as to ensure that the tension force of the connecting ropes 502 to pull the electric drill 11 is of sufficient and appropriate strength.

However, meanwhile, the disadvantage of this method is that the state where the flat plates 503 are snap-fit with the stepless adjustment opening 207 is relatively unstable. The snap-fit state is not likely to release during the complete single pushing process of the lever unit 3, but the probability of release and detachment increases if the lever unit 3 is pushed repeatedly.

The stepped adjustment threaded groove 208 has the advantage and disadvantage, which are diametrically opposed to the stepless adjustment opening 207. The stepped adjustment threaded groove is relatively cumbersome to install as the constant tightening of the screw stems 504 is required, and the number of the stepped adjustment threaded grooves 208 is limited after all. Therefore, when the electric drill 11 is replaced with a new one, there may be an unexpected situation where the threaded rods 504 are unable to reach the farther stepped adjustment threaded groove 208, and it is not tight enough to tighten the connecting ropes 502 at the closer stepped adjustment threaded grooves 208.

The 2 groups of connecting ropes 502, flat plates 503 and screw stems 504 may even be used in an alternating manner that one is located on the top of the other, with one being snap-fit and the other being in screwed connection, provided that it ensures the stable installation of the electric drill 11.

According to an application method of the precisely-positioned drilling apparatus for steel tubular joints, after different sizes of electric drills 11 are replaced, a position where the diagonal tensioning member unit 5 is connected to the lifting frame unit 2 is adjusted, and the electric drill 11 is then pushed to perform drilling operation for crack arresting.

In this embodiment, the precisely-positioned drilling apparatus, i.e., an auxiliary tool used in cooperation with the electric drill 11, has the advantage of being adaptable to diversified electric drills 11 with different sizes, either larger or smaller. Therefore, before the lever unit 3 is pushed for use, the diagonal tensioning member unit 5 needs to be adjusted and re-tightened, so as to ensure that the new electric drill 11 is stably installed.

Additionally, various types of electric hand drills commonly known in the art typically have a change in sizes, such as the length of the main body 11*c*, and the diameter of the main body 11*c* and the diameter of the drill rod 11*a* are generally of uniform specifications.

The implementations of the present disclosure are described in detail with reference to the drawings, however, the present disclosure is not limited to these. Those of ordinary skill in the art can also make various modifications within their knowledge range without departing from the purpose of the present disclosure. These modifications are not inventive, and are protected by patent laws as long as they fall within the scope of the claims of the present disclosure.

What is claimed is:

1. A precisely-positioned drilling apparatus for steel tubular joints, structurally comprising an electric drill (11), wherein the precisely-positioned drilling apparatus further comprises a base unit (1) for connecting branch tubes (a), a lifting frame unit (2) which is in inserted connection to the base unit (1) and used for installing the electric drill (11), a lever unit (3) which is arranged on the base unit (1) and used for pushing the electric drill (11), a positioning tube unit (4) which is arranged on the lifting frame unit (2) and used for sleeving a drill rod (11*a*), and a diagonal tensioning member unit (5) which is arranged on the lifting frame unit (2) and used for connecting a grab handle (11*b*).

2. The precisely-positioned drilling apparatus for steel tubular joints according to claim 1, wherein the base unit (1) comprises a block body (101), an intermediate slot (102) which is formed in the block body (101) and used for installing the lever unit (3), and 2 T-shaped snap-fit through holes (103) which are formed in the block body (101), respectively positioned on two sides of the intermediate slot (102), and used for allowing the lifting frame unit (2) to be inserted therein.

3. The precisely-positioned drilling apparatus for steel tubular joints according to claim 2, wherein the lever unit (3) comprises a fixing shaft (301) arranged in the intermediate slot (102), and a push rod (302) which has one end that is articulated on the fixing shaft (301) and is used for pushing a main body (11*c*).

4. The precisely-positioned drilling apparatus for steel tubular joints according to claim 2, wherein the lifting frame unit (2) comprises T-shaped strips (201) which are inserted into the T-shaped snap-fit through holes (103), 2 connecting strips (202) which are arranged on the two T-shaped strips (201), respectively positioned on two sides of the block body (101), and used for installing the diagonal tensioning member unit (5), a central hole plate (203) which is arranged on the two T-shaped strips (201) and used for allowing the main body (11*c*) to be inserted therein for fixing, and an upper hole plate (204) which is arranged on the two T-shaped strips (201), and used for allowing the drill rod (11*a*) to be inserted therein and installing the positioning tube unit (4).

5. The precisely-positioned drilling apparatus for steel tubular joints according to claim 4, wherein the lifting frame unit (2) further comprises 2 transverse plates (205) which are respectively arranged on the central hole plate (203) and the upper hole plate (204) and used for connecting the two T-shaped strips (201), and 2 side holes (206) which are formed in the upper hole plate (204) and used for allowing the positioning tube unit (4) to be inserted therein for installation.

6. The precisely-positioned drilling apparatus for steel tubular joints according to claim 5, wherein the positioning tube unit (4) comprises movable rods (401) which are inserted into the side holes (206), a positioning hole plate (402) which is arranged on the two movable rods (401) and used for allowing the drill rod (11*a*) to be inserted therein, an outer tube (403) which is arranged on the positioning hole plate (402), sleeves the drill rod (11*a*), and is used for positioning on cracks, and jack-up springs (404) which sleeve the movable rods (401), and are connected with the positioning hole plate (402) and the upper hole plate (204).

7. The precisely-positioned drilling apparatus for steel tubular joints according to claim 4, wherein the diagonal tensioning member unit (5) comprises a connecting ring (501) sleeving the grab handle (11*b*), connecting ropes (502) arranged on the connecting ring (501), flat plates (503) which are arranged on the connecting ropes (502) and used for being fixedly snap-fit on the connecting strips (202), and screw stems (504) which are arranged on the flat plates (503) and used for being in fixed and threaded connection on the connecting strips (202).

8. The precisely-positioned drilling apparatus for steel tubular joints according to claim 7, wherein the two connecting ropes (502) are provided, which are respectively arranged on two sides of the lever unit (3).

9. The precisely-positioned drilling apparatus for steel tubular joints according to claim 7, wherein the lifting frame unit (2) further comprises stepless adjustment openings (207) which are formed in the connecting strips (202), and used for allowing the flat plates (503) to be inserted therein for snap-fitting, and a plurality of pairs of stepped adjustment threaded grooves (208) which are formed in the stepless adjustment openings (207) and used for installing the screw stems (504).

10. An application method of the precisely-positioned drilling apparatus for steel tubular joints according to claim 1, wherein after different sizes of electric drills (11) are replaced, a position where the diagonal tensioning member unit (5) is connected to the lifting frame unit (2) is adjusted, and the electric drill (11) is then pushed to perform drilling operations for crack arresting.

* * * * *